3,159,657
PREPARATION OF LIGHT-COLORED SULFO-
NATED FATTY ACIDS AND FATTY ACID
DERIVATIVES
Carl Wulff, Dusseldorf-Benrath, Werner Stein, Dusseldorf-Holthausen, Otto Koch, Hilden, Rhineland, and Herbert Weiss, Cologne-Deutz, Germany, assignors to Henkel & Cie. GmbH., Dusseldorf-Holthausen, Germany, a German corporation
No Drawing. Filed May 15, 1962, Ser. No. 194,998
Claims priority, application Germany May 19, 1961
10 Claims. (Cl. 260—400)

This invention relates to the bleaching of α-sulfonated fatty acids, esters, and nitriles. The invention more particularly relates to and has as its object the bleaching of the dark-colored α-sulfonation products obtained upon sulfonating with an excess of gaseous $SO_3$, fatty acids, fatty acid esters, and fatty acid nitriles containing a substantially saturated fatty acid radical with 6 to 28 and preferably 8 to 18 carbon atoms and which are free from alcoholic hydroxyl groups.

α-Sulfonation of the above-described materials, as contrasted to sulfonation of unsaturated compounds or materials having a sulfatizable hydroxyl group requires extremely harsh sulfonating conditions. In order to obtain a high degree of sulfonation in a commercially practical manner, it is generally necessary to effect the sulfonation with an excess of gaseous $SO_3$. When proceeding in this manner, however, an excessive amount of very dark-colored decomposition products are formed which have previously required separation by prohibitively expensive and impractical modes, such as recrystallization.

In our co-pending applications Serial Nos. 194,840, and 194,786, processes are described which allow the α-sulfonation to be effected with an excess of gaseous $SO_3$ with the obtaining of a high degree of sulfonation while substantially suppressing the formation of the dark-colored decomposition products. It is often, however, commercially desirable to still further lighten the colors of the sulfonation products obtained by these processes.

While it is well known to bleach sulfonation products obtained by the sulfonation of materials containing a readily sulfonatable group, such as an unsaturated bond or alcoholic group, the α-sulfonation products are of an entirely different nature and contain entirely different colored impurities. Thus, for example, relatively dark-color alkylbenzene sulfonic acids will become brighter when neutralized but the α-sulfonation products to be treated in accordance with the invention will become darker when neutralized.

While alkylaryl sufonic acids may, for example, be successfully bleached with hydrogen peroxide, the addition of hydrogen peroxide to the α-sulfonation products may actually result in a further deepening of the undesirable color.

In accordance with the invention, it has surprisingly been found that the above-mentioned dark colored α-sulfonation products may be substantially lightened to a commercially attractive form by treatment with relatively small quantities of hydrogen peroxide if very specific amounts of water are maintained in the mixture during the bleaching in relation to the free $SO_3$.

In accordance with the invention, the bleaching is effected at a temperature between about 20–100° C. with about 0.2–6% by weight of hydrogen peroxide while maintaining a water content in the mixture so that the $SO_3$ concentration in the water does not exceed 90% and so that the sulfuric acid forming from the free sulfur trioxide and water has a concentration of at least 20%.

As starting fatty acids which may be α-sulfonated to obtain the dark-colored α-sulfonated products to be bleached in accordance with the invention, any substantially saturated fatty acids having from 6 to 28 and preferably 8 to 18 carbon atoms may be used. These fatty acids may be in the form of their esters or nitriles but aside from the hydrogen atom in the α-position, no sulfonatable groups, such as double bonds or alcoholic hydroxyl group, are to be present.

The fatty acids may be derived from vegetable fats, tallow, whale or fish oil and the esters can be obtained by esterification of these fatty acids with an alcohol which may be monovalent or polyvalent and preferably ranges from monovalent to trivalent. Where the fatty acid esters are produced with primary aliphatic alcohols, these alcohols may contain from 1 to 20 carbon atoms in the molecule. Fatty acid esters which contain residues of still higher alcohols in the molecule may also be used. Some of the easily obtainable fatty acid esters with higher fatty alcohols are hydration products of sperm oil or the oleyl oleate occurring in sperm oil, or natural or synthetic wax esters.

The bleaching in accordance with the invention has proven most effective if performed on the α-sulfonation products of the fatty acid esters.

Many fatty acids, particularly those of natural origin, and the esters of nitriles produced therefrom, often contain accompanying substances which during the sulfonation produce strongly colored decomposition products. While it is possible to effect the process in accordance with the invention in the presence of these decomposition products and bleach the same, it is nevertheless recommended not to encumber the bleaching process with such products and to remove the same prior to sulfonation. These accompanying substances include unsaturated fatty acids, their esters, natural triglycerides, proteins, mucins, and the like which may be removed in a manner known per se, as for example by distillation or in connection with materials which cannot be readily distilled by deacidification and refinement.

The bleaching in accordance with the invention is generally effected on the crude sulfonation product immediately following the sulfonation, but may also be effected in connection with α-sulfonated fatty acids which have been esterified with monovalent or polyvalent alcohols.

For the bleaching, hydrogen peroxide or compounds which form hydrogen peroxide, under the conditions of the process, are added to the sulfonation products. Even, upon the addition of small quantities, such as 0.2% by weight, figured as 100% of $H_2O_2$ with reference to the unprepared, crude sulfonation product, a clearly discernable lightening of color is to be seen, which first becomes detectable on the colorimeter by its blue component. Then, as the amount of $H_2O_2$ increases to say, 0.5, 1, or 1.5 percent by weight, the brightening extends to the red and yellow components. The amounts of hydrogen peroxide here mentioned are to be considered only by way of example. It must be determined in each individual case what quantities are necessary for the achievement of a sufficient bleaching effect for the purpose in view. The amounts of hydrogen peroxide to be used are, of course, governed by the amount of colored impurities which possibly increases with the length of the chain of the fatty acids, so that in the case of long-chain fatty acids, larger amounts of hydrogen peroxide are generally necessary that in the case of short-chain fatty acids. In general, a perceptible brightening will be achieved with 0.2% by weight in hydrogen peroxide, and it can be further improved by increasing the amount to 3% by weight, for example. In special cases, as much as 6% may be used. Preferably, the bleaching is done with 1 to 3% by weight, figured at 100% $H_2O_2$ with reference to the crude sulfonation product.

The hydrogen peroxide may also be formed in situ by initially adding materials, such as salts, hydroperoxides, and organic addition compounds thereof. Among the salts of hydrogen peroxide are those compounds in which at least 1 hydrogen atom of the hydrogen peroxide is substituted by a cation, preferably an inorganic cation. Examples are the peroxides of sodium, potassium, magnesium, calcium, strontium, and barium. The hydroperoxides of hydrogen peroxide include the substances derived from the borates, carbonates, orthophosphates and pyro- and polyphosphates, particularly the tripolyphosphates, the said compounds preferably containing sodium or potassium as the cation. The organic addition compounds of hydrogen peroxides include those formed with urea or hexamethylene tetramine.

Most of these substances react with the excess sulfur trioxide usually present in the sulfonation product, or react with the sulfuric acid formed from the sulfur trioxide upon the addition of water, to form salts. This formation of salts is not essential to the performance of the process of the invention because excess sulfonating agent is available in most cases. But even if all the sulfonating agent should be bound, the acidity of the free sulfonic acid suffices to cause the bleaching to proceed.

The quantities of the substances to be used according to the invention, from which hydrogen peroxide forms under the operating conditions, are equivalent to the quantities of hydrogen peroxide stated herein.

If these materials are added in the solid state it is recommended to use them in very finely divided form and to promote their uniform distribution in the sulfonation product, by diluting the latter with water, for example by adding the solid bleach in the form of aqueous suspensions, is recommended.

Water must be added along with the hydrogen peroxide or separately therefrom so that the concentration of the sulfur dioxide base on the water does not exceed 90% by weight and is not more dilute than would form less than a 20% sulfuric acid concentration. Preferably, such amounts of water are used that the sulfur trioxide content based on the sulfur trioxide and water ranges from 90 down to 50% by weight.

Since sulfonating agents, especially sulfur trioxide, and hydrogen peroxide, and water are mixed with the sulfonic acid that is to be bleached, the above-stated concentrations are merely of mathematical significance and are computed on the basis of the excess amount of sulfonating agent, and the amount of water put in at the commencement of the process, disregarding the amount of the sulfonic acid and of any by-products. The amounts of water formed from the hydrogen peroxide during the bleaching are not included in these computations. Operating within the above-stated concentration ranges has the advantage in the case of fatty acid esters that cleavage of the ester bond remains slight and the content of resultant sulfonated fatty acids in the end product is not harmful in many applications. If the narrower range of concentrations is used, the saponification of the fatty acid esters is practically negligible.

For effecting the process according to the invention, the hydrogen peroxide is added to the sulfonic acid in the necessary amount as determined, if necessary, by preliminary tests. The latter often becomes warm with the temperature rising, for example to 60° C. If no self-heating occurs, then it is recommended to heat the product that is to be bleached.

However, care must be taken to see that the temperature of the mixture does not exceed 100° C. Temperatures this high should be used only when the apparatus is such that the reaction heat evolved at this temperature can be removed rapidly. If this is not the case, then it is expedient to operate at temperatures lower than 90° and preferably below 80° C.

The length of the bleaching operation varies according to the starting material, the amount of hydrogen peroxide, and the temperature, which is to amount to at least 20° C. Short reaction times of, for example, 2 to 15 minutes are generally used at high temperatures of, for example, 70 to 90°, while reaction times of 15 minutes to 5 hours are used at lower temperatures of, say, 40 to 70° C. These times are only to be considered as a rough guide, and the bleaching time can be shorter or longer and can range from 1 minute to 75 hours.

The bleached products can then be further processed, if desired. For example, the bleached sulfonated fatty acids can be esterified in a known manner with monovalent or polyvalent alcohols, it being possible to process both the free sulfonated fatty acids and their monosalts. The abovementioned monovalent-or-polyvalent alcohols can serve as esterification components. If polyvalent alcohols are used, it is possible also to produce partial esters of polyvalent alcohols.

If, after the further processing, the products are not already in the form of their salts, they can be converted to their salts in a manner known per se, in which case the excess sulfonating agent can first be removed.

The practicability of the process of the invention was also surprising because the amount of water that is brought in with the hydrogen peroxide or which forms from the hydrogen peroxide is enough to dissociate all of the fatty acid ester, a thing which was entirely to be expected in view of the amounts of sulfuric acid or sulfur trioxide present in the crude sulfonation product. Such is not, however, the case: the slight amount of dissociated ester in the neutralized products is not greater than it is in the case of the unbleached products.

It is true that attempts have already been made to purify the sulfonic acids obtained by the sulfonation of fatty acids with sulfur trioxide, but, according to J. K. Weil, A. J. Stirton, R. G. Bistline, Jr., and W. C. Ault: "The Journal of the American Oil Chemists' Society," vol. 37 (1960), page 679, left-hand column, last paragraph, and the right-hand column, 6th paragraph, these experiments offered considerable difficulties. Purification was, therefore, attempted indirectly through the salts of these compounds. It was, therefore, especially surprising that these crude sulfonation products of fatty acids or their derivatives, which must be considered as valueless products on account of their deep dark brown color, can be converted by treatment with small amounts of hydrogen peroxide into bright yellow products which, in regard to their color, are not inferior to other customarily used sulfonation products. While the unbleached crude sulfonation products have an unpleasant odor and develop sulfur dioxide after long storage, the bleached products have a definitely pleasant odor; they can also be stored for a long time, even in the unneutralized state, without evolving sulfur dioxide.

The following examples are given by way of illustration and not limitation. In these examples, the following general procedure was used:

The necessary amount of hydrogen peroxide was added, with cooling, to the sulfonation product which had been cooled to room temperature, the mixture was gradually heated to the bleaching temperature and kept at that temperature. Unless otherwise stated in the example, 3% $H_2O_2$ by weight, with reference to the crude sulfonation product, was used, in the form of a 40% hydrogen peroxide, and the bleaching was done for 30 minutes at 60° C. After bleaching, the reaction product was cooled to room temperature and then neutralized with 30% solution of caustic soda. The $H_2O_2$ used for the bleaching can also, of course, be added gradually with the cooling of the crude sulfonation product effected prior to the addition of hydrogen peroxide and the subsequent heating to the bleaching temperature can thus be avoided.

Instead of caustic soda solution, any other customarily used acid-binding substance can be used, as, for example, caustic potash solution or the carbonates or bicarbonates of the alkalis, such as earth-alkali compounds, as well as ammonia and organic bases, especially primary, secondary, or tertiary amines with alkyl or alkylol residues of 1 to 5 carbon atoms.

The "sulfuric acid" present in the sulfonation product, which is mentioned in the examples, is the sulfuric acid which forms from excess sulfonating agent, especially $SO_3$, and water, especially the water that comes in with the hydrogen peroxide. The composition of this sulfuric acid, which is given as a percentage by weight, is computed under the assumption that no $H_2O_2$ has yet reacted.

The color values were measured on aqueous solutions of the neutralized unbleached and bleached sulfonation products, which contained 5% by weight of the neutralized sulfonation product. The "Lovibond Tintometer" made by Tintometer, Ltd., Salisbury, England, was used for the measurements; the solutions to be measured were placed in cells of a thickness of 4″.

Example 1

Various sulfonation products obtained by sulfonating a mixture of equal parts by weight of the hydrated ethyl esters of coconut and palm nut fatty acids (acid number=1.5, saponification number=222, iodine number=0) with air containing sulfur trioxide at 80° C. were used as the starting material for the bleaching experiments described in this example. The sulfonation products contained about 0.3 mol of unreacted sulfur trioxide in solution per mol of fatty acid esters. The color values of the unbleached neutralized sulfonation products were approximately within the following ranges: yellow≧27, red 14–20, blue 9–16.

(a) How the bleaching effect depends on the amount of hydrogen peroxide:

| Percentage of 100% $H_2O_2$ bleach in the crude sulfonation product | Composition of the $H_2SO_4$ in the sulfonation product | | Color values | | |
|---|---|---|---|---|---|
| | Percent $SO_3$ | Percent $H_2O$ | Yellow | Red | Blue |
| 0.5 | 93 | 7 | 18.6 | 3.4 | 0.5 |
| 1 | 86 | 14 | 7.3 | 1.0 | 0.4 |
| 1.5 | 80 | 20 | 2.5 | 0.7 | 0.9 |
| 2 | 75 | 25 | 2.5 | 0.5 | 0.9 |
| 2.5 | 71 | 29 | 1.9 | 0.3 | 0.5 |
| 3 | 69 | 31 | 1.5 | 0.3 | 0.7 |

(b) How the bleaching effect depends on the bleaching temperature:

[Composition of the sulfuric acid present in the sulfonation product: 69% $SO_3$ and 31% $H_2O$, bleaching time 15 minutes]

| Bleaching Temperature in °C. | Color values | | |
|---|---|---|---|
| | Yellow | Red | Blue |
| 20 | 18.0 | 3.3 | 0 |
| 40 | 10.0 | 1.7 | 0 |
| 60 | 4.4 | 1.2 | 0.5 |
| 80 | 23.0 | 1.2 | 0.5 |

(c) How the bleaching effect depends on the time:

[Composition of the sulfuric acid present in the sulfonation product: 69% $SO_3$ and 31% $H_2O$, bleaching temperature 20°C.]

| Bleaching Time | Color values | | |
|---|---|---|---|
| | Yellow | Red | Blue |
| 15 minutes | 15.1 | 2.7 | 0 |
| 30 minutes | 8.0 | 1.4 | 0 |
| 1 hour | 7.3 | 1.3 | 0 |
| 3 hours | 5.6 | 1.2 | 0 |
| 5 hours | 4.8 | 0.9 | 0 |
| 9 hours | 3.7 | 0.9 | 0 |
| 24 hours | 3.5 | 0.7 | 0 |
| 48 hours | 2.1 | 0.4 | 0 |

(d) How the bleaching effect depends on time:

[Composition of the sulfuric acid present in the sulfonation product: 69% $SO_3$ and 31% $H_2O$, bleaching temperature 60°C.]

| Bleaching Time | Color values | | |
|---|---|---|---|
| | Yellow | Red | Blue |
| 5 minutes | 8.3 | 1.3 | 0 |
| 15 minutes | 5.2 | 1.0 | 0 |
| 30 minutes | 3.2 | 0.7 | 0 |
| 1 hour | 2.5 | 0.6 | 0 |
| 3 hours | 2.2 | 0.5 | 0 |

(e) How the bleaching effect depends on time:

[Composition of the sulfuric acid present in the sulfonation product: 69% $SO_3$ and 31% $H_2O$, bleaching temperature 90°C.]

| Bleaching Time | Color values | | |
|---|---|---|---|
| | Yellow | Red | Blue |
| 5 minutes | 4.2 | 0.9 | 0 |
| 15 minutes | 3.5 | 0.8 | 0 |
| 30 minutes | 3.2 | 0.7 | 0 |
| 1 hour | 27 | 3.5 | 0 |
| 2 hours | 27 | 5.3 | 0 |
| 3 hours | 27 | 6.2 | 0 |

(f) How the bleaching effect depends on concentration of the hydrogen peroxide.

[1% $H_2O_2$ by weight]

| Concentration of the hydrogen peroxide in percent | Composition of the sulfuric acid present in the sulfonation product | | Color values | | |
|---|---|---|---|---|---|
| | Percent $SO_3$ | Percent $H_2O$ | Yellow | Red | Blue |
| 60 | 93 | 7 | 27 | 5.2 | 0 |
| 40 | 86 | 14 | 25 | 4.0 | 0 |
| 30 | 81.5 | 18.5 | 12 | 2.2 | 0 |
| 20 | 69 | 31 | 13 | 2.5 | 0 |
| 10 | 51 | 49 | 9.3 | 1.7 | 0 |
| 5 | 35 | 65 | 20 | 3.3 | 0 |

(g) How the bleaching effect depends on the concentration of the hydrogen peroxide.

[2% $H_2O_2$ by weight]

| Concentration of the hydrogen peroxide in percent | Composition of the sulfuric acid present in the sulfonation product | | Color values | | |
|---|---|---|---|---|---|
| | Percent $SO_3$ | Percent $H_2O$ | Yellow | Red | Blue |
| 80 | 93 | 7 | 16 | 2.3 | 0 |
| 60 | 88 | 12 | 11 | 2.2 | 0 |
| 50 | 81.5 | 18.5 | 16 | 2.8 | 0 |
| 40 | 75 | 25 | 6.0 | 1.5 | 0 |
| 30 | 69 | 31 | 7.3 | 1.8 | 0 |
| 20 | 51 | 49 | 6.0 | 1.4 | 0 |
| 10 | 36 | 64 | 8.0 | 0.9 | 0.1 |

(h) How the bleaching effect depends on the concentration of the hydrogen peroxide.

[3% $H_2O_2$ by weight]

| Concentration of the hydrogen peroxide in percent | Composition of the sulfuric acid present in the sulfonation product | | Color values | | |
|---|---|---|---|---|---|
| | Percent $SO_3$ | Percent $H_2O$ | Yellow | Red | Blue |
| 80 | 93 | 7 | 7.0 | 1.7 | 0 |
| 60 | 81.5 | 18.5 | 2.7 | 0.7 | 0 |
| 40 | 69 | 31 | 2.0 | 0.3 | 0 |
| 20 | 47 | 53 | 3.1 | 0.8 | 0 |
| 10 | 27 | 73 | 7.0 | 1.3 | 0 |

Example 2

The starting material was a sulfonation product obtained in a manner similar to the starting material of Example 1, from hydrated tallow fatty acid ethyl ester (acid No.=1.2; saponification No.=187; iodine No.=0). The crude sulfonation product contains approximately 0.4 mol of unreacted sulfur trioxide in solution per mol of fatty acid ester.

| Percentage of 100% $H_2O_2$ bleach in the crude sulfonation product | Composition of the $H_2SO_4$ in the sulfonation product | | Color values | | |
|---|---|---|---|---|---|
| | Percent $SO_3$ | Percent $H_2O$ | Yellow | Red | Blue |
| 0 | | | ≧27.0 | 18.0 | 11.6 |
| 1 | 85 | 15 | 27.0 | 6.6 | 0.4 |
| 2 | 74 | 26 | 23.0 | 3.0 | 0 |
| 3 | 65.5 | 34.5 | 16.0 | 2.0 | 0 |
| 3.5 | 62 | 38 | 10.0 | 1.7 | 0 |
| 4 | 58.7 | 41.3 | 6.5 | 0.2 | 0.1 |

Example 3

The sulfonation product of a mixture of equal parts by weight of the fatty acid esters named in Examples 1 and 2 was bleached.

| Percentage of 100% $H_2O_2$ bleach in the crude sulfonation product | Composition of the $H_2SO_4$ in the sulfonation product | | Color values | | |
|---|---|---|---|---|---|
| | Percent $SO_3$ | Percent $H_2O$ | Yellow | Red | Blue |
| 0 | | | 27.0 | 16.4 | 10.7 |
| 1 | 85.5 | 14.5 | 27.0 | 3.8 | 0 |
| 2 | 74.5 | 15.5 | 17.0 | 2.0 | 0 |
| 3 | 66 | 34 | 9.0 | 1.6 | 0 |
| 3.5 | 63 | 37 | 8.5 | 1.7 | 0 |
| 4 | 59 | 41 | 2.0 | 0 | 0.2 |

Example 4

A sulfonation product, obtained in a manner similar to the one in Example 1 from deacidified, bleached, hardened and steamed coconut oil (acid number 0.4; saponification number 253; iodine number 1), was bleached. The crude sulfonation product contained approximately 0.3 mol dissolved free sulfur trioxide per fatty acid residue. After the bleaching and neutralizing, the result was a sulfonate with the following color numbers (color numbers of the sulfonate from the unbleached sulfonation product given in parentheses): yellow: 1.7 (27), red: 0.4 (12); blue: 0.3 (6.7).

Example 5

The sulfonation product of a caprylic acid ethyl ester (acid number 0.6, saponification number 325, iodine number 0), which had been obtained, in the same manner as the starting materials in the foregoing examples, from the ester and sulfur trioxide, and which contained approximately 0.3 mol sulfur trioxide in solution per mol of ester, was bleached with 2% by weight of $H_2O_2$. After bleaching and neutralizing, a sulfonate resulted having the following color numbers (color numbers of the sulfonate from the unbleached sulfonation product given in parentheses): yellow 0.8 (25); red: 0.2 (9.5); blue 0.2 (6.3).

Example 6

The sulfonation product of a fatty acid was bleached (mixture of equal prats by weight of a palm nut and a coconut oil fatty acid (acid number 257, saponification number 258, iodine number 0.4)) which had been obtained in a manner similar to the sulfonation products bleached in the preceding examples. The sulfonation product contained 0.3 mol free sulfur trioxide per mol of fatty acid. The bleach was 4% $H_2O_2$. The crude sulfonation product was so dark that the color values could not be measured in a 4" cell. The bleached product had the following color values: yellow 18, red 2.0, blue 0.

Example 7

The starting material was a product obtained by sulfonating palmitic acid nitrile with a current of air containing sulfur trioxide at 70° C., this product containing about 0.1 mol free $SO_3$ per mol of nitrile. The bleaching was done as in the foregoing example. The color values of the bleached product were: yellow 27, red 4.3, blue 1.2; the unbleached product was so dark that the color values could not be measured in a 4" cell.

Example 8

The crude product obtained by sulfonating palmitic acid with an excess of $SO_3$ (1.3 mol $SO_3$ per mol of palmitic acid) at 80° C. was bleached in the described manner with 4% by weight of $H_2O_2$. The crude sulfonation product was so dark that the color values of the sulfonate obtained from it could not be measured in a 4" cell. The bleached sulfonate had the following color values: yellow 27, red 5.0, blue 0.5.

Example 9

The crude sulfonation product processed in Example 8 was heated for 5 hours with reflux, with 8 mols of ethyl alcohol. The excess ethyl alcohol was then distilled away. The residue contained practically no more free sulfonating agents, the latter having reacted with the ethyl alcohol. The bleaching was performed as in the preceding example. The bleached sulfonate had the following color values: yellow 27, red 7.1, blue 0.

Example 10

(a) 700 grams of the bleached sulfo palmitic acid obtained as in example 8 were heated for 4 hours with reflux, after the addition of 1400 grams ethanol, but without further preparation. Then the acid was neutralized with 20% aqueous caustic soda solution. After filtering the hot solution, the alcohol was evaporated away and the residue was dried in the desiccator. The salt of the sulfo palmitic acid ester was thus produced in a yield of about 95% of the theory; it had the following characteristics: acid number 0.7; saponification number 144.

(b) A somewhat purer product was obtained when the esterification product obtained as in paragraph a was neutralized with a methanol solution of caustic soda instead of an aqueous solution. A small amount of a salt then separated out, which did not dissolve even when heated, and which consisted of sodium sulfate or some disodium salt of sulfo palmitic acid.

After the warm solution was filtered and the filtrate was cooled, the sodium salt of sulfo palmitic acid ester precipitated out, amounting to a yield, after filtering and drying, of 75% of the theory.

(c) The procedures described under a and b were performed with first converting the sulfo palmitic acid into the monosodium salt and then esterifying the latter under pressure at temperatures of 180–220° C.

Example 11

The crude sulfonation product processed as the starting material was made in an apparatus which consisted of five stainless steel vessels arranged in series.

The first four reaction vessels were filled with a hardened palm nut fatty acid ethyl ester (iodine number 0.1) and the temperatures in the vessels were adjusted as follows: 1st vessel=50°, 2nd vessel=50°, 3rd vessel= 65°, 4th vessel=80°, 5th vessel=85° C. Then sulfur trioxide, diluted with twenty times the amount of air, was blown into the first four vessels in such amounts that the ester in vessels 1 to 4 had absorbed the following amounts of sulfur trioxide expressed as a percentage of the stoichiometrical amount required for quantitative sulfonation: 52, 78, 104 and 130%, respectively. No sulfur dioxide-air mixture was blown into the fifth vessel.

After these amounts had been taken up, 1.71 kg. ester was pumped continuously per hour into the first vessel, and into the first four reaction vessels so much of the above-mentioned sulfur trioxide-air mixture was introduced that the ester coming out of vessel 4 had taken up a total of 1.3 mol per mol of fatty acid ester, and 40% of this amount of sulfur trioxide had been taken up in vessel 1 and 20% in each of vessels 2 to 4. In this case, too, no sulfur trioxide was blown into the fifth vessel as this vessel was used for completing the reaction.

For the continuous bleaching of the blackish-brown reaction product thus obtained, which contained about 0.3 mol sulfur trioxide per mol of fatty acid ester, it was cooled to 20 to 22° C. in a heat exchanger. 2420 grams per hour of the product coming from the heat exchanger were mixed in a mixer with 181 grams per hour of a 20% aqueous solution of hydrogen peroxide. The dwelling time in the mixer amounted to 1 minute. The mixture then passed through a cooling zone, in which so much of the reaction heat was carried off, that the product, after leaving the cooling zone, had a temperature of 35 to 40° C. Then the product was fed for re-action through two vessels, in which it was heated first to 40° C. and then to 60° C. The dwelling time in the first vessel was 2 hours and in the second vessel 2 hours. The product was then neutralized with 6% aqueous caustic soda.

The above-described experiment was kept in operation continuously for 72 hours, and resulted in a product which had a degree of sulfonation that remained uniform over the entire time of the experiment at 95%, and which showed the following color values: yellow 2.0, red 0.1, blue 0.0.

Example 12

The starting material was a crude sulfofatty acid which had been produced by the introduction of 52 grams sulfur trioxide in the form of an air-sulfur trioxide mixture into a hydrated palm nut fatty acid maintained at 80° C. This product was bleached for one hour at 60° C. by the addition of 4% of its weight in 40% hydrogen peroxide. Then a five-fold molar amount of ethyl alcohol was added and the mixture was boiled for 8 hours with reflux. After distilling away the ethyl alcohol and removing the last ethyl alcohol residues in a vacuum, the mixture was neutralized with aqueous caustic soda solution. The colors of the bleached product were as follows (those of a product made in the same manner without bleaching are given in parentheses): yellow 27 (27), red 5.0 (25), blue 0.5 (18).

Example 13

The sulfonation product processed in Example 12 was esterified with ethyl alcohol in the manner described therein, prior to bleaching, and the excess ethyl alcohol was distilled off. The bleaching was then done with hydrogen peroxide as described, and the product was then neutralized. The bleached sulfonate (unbleached figures between parentheses) showed the following color values: yellow 27 (27), red 8.4 (23), blue 2.3 (17).

Example 14

The crude sulfonation product which was processed was made from a hydrated palm nut fatty acid ethyl ester (iodine number 0.4) by the introduction of gaseous sulfur trioxide diluted with 20 times the amount of air, at 80° C. In the course of one hour, 1.3 mol sulfur trioxide was added per mol of fatty acid residue; then the reaction product was kept at 80° C. for 15 minutes more and then cooled to room temperature. The sulfonation product had a sulfur trioxide content of about 7.8% by weight.

The oxidants named below were stirred into the crude sulfonation product in the proportion of 3% by weight, in the form of 40% aqueous solutions and suspensions, respectively. The mixture was then heated to 60° C. and kept at this temperature for 1 hour. Then it was neutralized with 10% caustic soda solution. The color values of the neutralized product were measured with a Lovibond Tintometer in a 4″ cell. The concentration of the solutions being measured was adjusted to 5% by weight with reference to the crude, acid sulfonation product.

| Bleach | Composition of the sulfuric acid in the sulfonation product— | | | | Color values | | |
|---|---|---|---|---|---|---|---|
| | Before reaction with the bleach | | After reaction with the bleach | | Yellow | Red | Blue |
| | Percent $SO_3$ | Percent $H_2O$ | Percent $SO_3$ | Percent $H_2O$ | | | |
| $NaBO_2.H_2O_2$ | 64 | 36 | 60 | 40 | 2.5 | 0.6 | 0 |
| $Na_2O_2$ | 64 | 36 | 52 | 48 | 13 | 2.7 | 0 |

While the invention has been described in detail with reference to certain specific embodiments, various changes and modifications which fall within the spirit of the invention will become apparent to the skilled artisan. The invention is only intended to be limited by the appended claims or their equivalents wherein we have endeavored to claim all inherent novelty.

What is claimed is:

1. Process for lightening the color of dark-colored α-sulfonation products obtained by sulfonating a member selected from the group consisting of substantially saturated fatty acids containing from 6 to 28 carbon atoms, their esters which are free from alcoholic hydroxyl groups, their nitriles, and mixtures thereof with an excess of gaseous sulfur trioxide which comprises contacting the dark-colored sulfonation product with about 0.2–6% by weight of hydrogen peroxide at a temperature between about 20–100° C. in the presence of an added amount of water sufficient to maintain the concentration of free $SO_3$ calculated with respect thereto between 90% by weight and that of a 20% sulfuric acid solution.

2. Process according to claim 1 in which said contacting is effected with about 1–4% by weight of hydrogen peroxide.

3. Process according to claim 1 in which said contacting is effected at a temperature between about 40–80° C.

4. Process according to claim 1 in which said group member is an ester.

5. Process according to claim 1 in which said group member is an ester with a lower alcohol.

6. Process according to claim 1 in which said hydrogen peroxide is formed in situ.

7. Process according to claim 1 in which said sulfonation product is converted into the form of the monosodium salt and esterified prior to said contacting.

8. Process according to claim 1 in which the sulfonation product is esterified prior to said contacting.

9. Process according to claim 1 in which said excess $SO_3$ is present in amount of about .05–1 mol.

10. Process according to claim 1 in which said hydrogen peroxide is in the form of a 20–75% solution.

References Cited in the file of this patent

UNITED STATES PATENTS

| | | |
|---|---|---|
| 1,734,050 | Seck | Nov. 5, 1929 |
| 2,049,975 | Reichert et al. | Aug. 4, 1936 |
| 2,460,968 | Bert et al. | Feb. 8, 1949 |
| 3,006,934 | Dieckelmann | Oct. 31, 1961 |